United States Patent
Wang et al.

(10) Patent No.: US 10,264,601 B2
(45) Date of Patent: Apr. 16, 2019

(54) DOWNLINK CONTROL INFORMATION TRANSMISSION METHOD AND APPARATUS

(71) Applicant: Huawei Technologies Co., Ltd., Shenzhen, Guangdong (CN)

(72) Inventors: Lei Wang, Shanghai (CN); Xiuqiang Xu, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/687,293

(22) Filed: Aug. 25, 2017

(65) Prior Publication Data

US 2017/0359834 A1 Dec. 14, 2017

Related U.S. Application Data

(63) Continuation of application No. PCT/CN2015/073376, filed on Feb. 27, 2015.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0037* (2013.01); *H04L 5/0053* (2013.01);
(Continued)

(58) Field of Classification Search
CPC ......... H04W 72/1289; H04W 72/1273; H04W 72/042; H04W 72/121; H04L 5/0053;
(Continued)

(56) References Cited

U.S. PATENT DOCUMENTS

| | | | |
|---|---|---|---|
| 8,433,251 B2 * | 4/2013 | Chen | H04L 5/001 370/255 |
| 2012/0127913 A1* | 5/2012 | Lin | H04W 68/00 370/312 |
| 2014/0241234 A1 | 8/2014 | Zhu et al. | |
| 2014/0254461 A1 | 9/2014 | Li et al. | |

(Continued)

FOREIGN PATENT DOCUMENTS

| | | | |
|---|---|---|---|
| CN | 103095444 A | 5/2013 | |
| CN | 103096379 A | 5/2013 | |

(Continued)

*Primary Examiner* — Joshua Kading

(57) ABSTRACT

The present disclosure describes a downlink control information transmission method and apparatus. The method includes: determining multiple terminal devices used for downlink scheduling; determining downlink control information used by the multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and sending the downlink control information to the multiple terminal devices.

20 Claims, 9 Drawing Sheets

(51) Int. Cl.
| | |
|---|---|
| *H04W 72/04* | (2009.01) |
| *H04B 7/00* | (2006.01) |
| *H04B 7/0452* | (2017.01) |
| *H04B 7/0456* | (2017.01) |
| *H04L 1/00* | (2006.01) |
| *H04L 25/00* | (2006.01) |

(52) U.S. Cl.
CPC ......... *H04L 5/0091* (2013.01); *H04W 72/042* (2013.01); *H04W 72/121* (2013.01); *H04W 72/1273* (2013.01); *H04B 7/00* (2013.01); *H04B 7/0452* (2013.01); *H04B 7/0456* (2013.01); *H04L 1/00* (2013.01); *H04L 25/00* (2013.01)

(58) Field of Classification Search
CPC ....... H04L 5/0091; H04L 5/0037; H04L 1/00; H04L 25/00; H04B 7/00; H04B 7/0452; H04B 7/0456
See application file for complete search history.

(56) References Cited

U.S. PATENT DOCUMENTS

| | | |
|---|---|---|
| 2015/0110055 A1 | 4/2015 | Lv et al. |
| 2016/0192331 A1* | 6/2016 | Liang ................... H04L 5/0048 370/329 |

FOREIGN PATENT DOCUMENTS

| | | |
|---|---|---|
| CN | 103636271 A | 3/2014 |
| JP | 2014176091 A | 9/2014 |
| WO | 2013068834 A1 | 5/2013 |
| WO | 2013077683 A1 | 5/2013 |

* cited by examiner

DOWNLINK CONTROL INFORMATION TRANSMISSION METHOD AND APPARATUS

CROSS-REFERENCE TO RELATED APPLICATIONS

This application is a continuation of International Patent Application No. PCT/CN2015/073376, filed on Feb. 27, 2015, the disclosure of which is hereby incorporated by reference in its entirety.

TECHNICAL FIELD

The present application relates to the communications field, and in particular, to a downlink control information transmission method and apparatus in the communications field.

BACKGROUND

In a cellular communications system, before transmitting downlink data to user equipment (UE) each time, a base station (BS) needs to send control information to the UE, to indicate, to the UE, information such as a time-frequency resource and a modulation and coding scheme that are used by the BS to transmit the downlink data, so that the UE can obtain, according to the control information, the downlink data transmitted by the BS. If there are multiple scheduled UEs, the BS may send control information of each scheduled UE to the UE.

For example, in a Long Term Evolution (LTE) system, control information of each UE may be encapsulated in downlink control information (DCI) carried by a physical downlink control channel (PDCCH), and one dedicated identifier of user equipment is added to the rear of each piece of DCI, so that the UE can obtain, by detecting a dedicated identifier of the UE, the control information for receiving downlink data.

With continuous evolution of a wireless cellular system, a future wireless cellular system not only needs to improve a total throughput, but also needs to support more users. Therefore, various multi-user technologies, for example, a conventional multi-user multiple-input multiple-output (MU-MIMO) technology and a non-orthogonal multiple access technology are certainly to be widely applied. In such an application scenario, with an increase of users, overheads for control information constantly increase, and particularly, repeatedly sending control information shared by users to the users causes a severe waste of system overheads.

SUMMARY

In view of this, embodiments of the present disclosure provide a downlink control information transmission method and apparatus, so as to resolve a problem that system overheads are relatively high.

According to a first aspect, a downlink control information transmission method is provided, and the method includes: determining multiple terminal devices used for downlink scheduling; determining downlink control information used by the multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and sending the downlink control information to the multiple terminal devices.

With reference to the first aspect, in a first possible implementation of the first aspect, the method further includes: sending the downlink data flows of the multiple terminal devices to the multiple terminal devices according to the downlink control information, where the order of the device identifier information of each terminal device is the same as an order of a downlink data flow of each terminal device.

With reference to the first possible implementation of the first aspect, in a second possible implementation of the first aspect, each terminal device has a same quantity of downlink data flows.

With reference to the first aspect, or the first or the second possible implementation of the first aspect, in a third possible implementation of the first aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the first aspect, or the first to the third possible implementations of the first aspect, in a fourth possible implementation of the first aspect, the dedicated control information of each terminal device includes hybrid automatic repeat request HARQ information and/or modulation and coding scheme MCS information of each terminal device.

According to a second aspect, a downlink control information transmission method is provided, and the method includes: receiving downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; obtaining the common control information according to the downlink control information; determining order information of device identifier information of a first terminal device according to the device identifier information of each terminal device in the downlink control information; and obtaining dedicated control information of the first terminal device from the downlink control information according to the order information.

With reference to the second aspect, in a first possible implementation of the second aspect, after the downlink control information sent by the network device is received, the method further includes: receiving downlink data flows of the multiple terminal devices that are sent by the network device; and determining, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

With reference to the first possible implementation of the second aspect, in a second possible implementation of the second aspect, each terminal device has a same quantity of downlink data flows.

With reference to the second aspect, or the first or the second possible implementation of the second aspect, in a third possible implementation of the second aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the second aspect, or the first to the third possible implementations of the second aspect, in a fourth possible implementation of the second aspect, the dedicated control information of each terminal device includes hybrid automatic repeat request HARQ information and/or modulation and coding scheme MCS information of each terminal device.

According to a third aspect, a downlink control information transmission apparatus is provided, and the apparatus includes: a first determining module, configured to determine multiple terminal devices used for downlink scheduling; a second determining module, configured to determine downlink control information used by the multiple terminal devices, which are determined by the first determining module, to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and a first sending module, configured to send the downlink control information determined by the second determining module to the multiple terminal devices.

With reference to the third aspect, in a first possible implementation of the third aspect, the apparatus further includes a second sending module, configured to send the downlink data flows of the multiple terminal devices to the multiple terminal devices according to the downlink control information, where the order of the device identifier information of each terminal device is the same as an order of a downlink data flow of each terminal device.

With reference to the first possible implementation of the third aspect, in a second possible implementation of the third aspect, each terminal device has a same quantity of downlink data flows that are sent by the second sending module.

With reference to the third aspect, or the first or the second possible implementation of the third aspect, in a third possible implementation of the third aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the third aspect, or the first to the third possible implementations of the third aspect, in a fourth possible implementation of the third aspect, the dedicated control information of each terminal device includes hybrid automatic repeat request HARQ information and/or modulation and coding scheme MCS information of each terminal device.

With reference to any one of the third aspect, or the first to the fourth possible implementations of the third aspect, in a fifth possible implementation of the third aspect, the apparatus is a network device.

According to a fourth aspect, a downlink control information transmission apparatus is provided, and the apparatus includes: a first receiving module, configured to receive downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; a first obtaining module, configured to obtain the common control information according to the downlink control information received by the first receiving module; a first determining module, configured to determine order information of device identifier information of a first terminal device according to the device identifier information of each terminal device in the downlink control information received by the first receiving module; and a second obtaining module, configured to obtain dedicated control information of the first terminal device from the downlink control information according to the order information determined by the first determining module.

With reference to the fourth aspect, in a first possible implementation of the fourth aspect, the apparatus further includes a second receiving module, configured to: after the first receiving module receives the downlink control information sent by the network device, receive downlink data flows of the multiple terminal devices that are sent by the network device; and a second determining module, configured to determine, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

With reference to the first possible implementation of the fourth aspect, in a second possible implementation of the fourth aspect, each terminal device has a same quantity of downlink data flows.

With reference to the fourth aspect, or the first or the second possible implementation of the fourth aspect, in a third possible implementation of the fourth aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the fourth aspect, or the first to the third possible implementations of the fourth aspect, in a fourth possible implementation of the fourth aspect, the dedicated control information of each terminal device includes hybrid automatic repeat request HARQ information and/or modulation and coding scheme MCS information of each terminal device.

With reference to any one of the fourth aspect, or the first to the fourth possible implementations of the fourth aspect, in a fifth possible implementation of the fourth aspect, the apparatus is user equipment.

According to a fifth aspect, a downlink control information transmission apparatus is provided, and the apparatus includes a processor, a memory, a bus system, and a transmitter, where the processor, the memory, and the transmitter are connected by using the bus system, the memory is configured to store an instruction, and the processor is configured to execute the instruction stored in the memory, so as to control the transmitter to send a signal, where the processor is configured to: determine multiple terminal devices used for downlink scheduling; and determine downlink control information used by the multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and the transmitter is configured to send the downlink control information to the multiple terminal devices.

With reference to the fifth aspect, in a first possible implementation of the fifth aspect, the transmitter is further configured to send the downlink data flows of the multiple terminal devices to the multiple terminal devices according to the downlink control information, where the order of the device identifier information of each terminal device is the same as an order of a downlink data flow of each terminal device.

With reference to the first possible implementation of the fifth aspect, in a second possible implementation of the fifth aspect, each terminal device has a same quantity of downlink data flows that are sent by the transmitter.

With reference to the fifth aspect, or the first or the second possible implementation of the fifth aspect, in a third possible implementation of the fifth aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the fifth aspect, or the first to the third possible implementations of the fifth aspect, in a fourth possible implementation of the fifth aspect, the dedicated control information of each terminal device includes hybrid automatic repeat request HARQ information and/or modulation and coding scheme MCS information of each terminal device.

With reference to any one of the fifth aspect, or the first to the fourth possible implementations of the fifth aspect, in a fifth possible implementation of the fifth aspect, the apparatus is a network device.

According to a sixth aspect, a downlink control information transmission apparatus is provided, and the apparatus includes a processor, a memory, a bus system, and a receiver, where the processor, the memory, and the receiver are connected by using the bus system, the memory is configured to store an instruction, and the processor is configured to execute the instruction stored in the memory, so as to control the receiver to receive a signal; where the receiver is configured to receive downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and the processor is configured to: obtain the common control information according to the downlink control information; determine order information of device identifier information of a first terminal device according to the device identifier information of each terminal device in the downlink control information; and obtain dedicated control information of the first terminal device from the downlink control information according to the order information.

With reference to the sixth aspect, in a first possible implementation of the sixth aspect, the receiver is further configured to: after receiving the downlink control information sent by the network device, receive downlink data flows of the multiple terminal devices that are sent by the network device; and the processor is further configured to determine, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

With reference to the first possible implementation of the sixth aspect, in a second possible implementation of the sixth aspect, each terminal device has a same quantity of downlink data flows.

With reference to the sixth aspect, or the first or the second possible implementation of the sixth aspect, in a third possible implementation of the sixth aspect, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

With reference to any one of the sixth aspect, or the first to the third possible implementations of the sixth aspect, in a fourth possible implementation of the sixth aspect, the dedicated control information of each terminal device includes hybrid automatic repeat request HARQ information and/or modulation and coding scheme MCS information of each terminal device.

With reference to any one of the sixth aspect, or the first to the fourth possible implementations of the sixth aspect, in a fifth possible implementation of the sixth aspect, the apparatus is user equipment.

Based on the foregoing technical solutions, in the downlink control information transmission method in the embodiments of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission method and apparatus in the embodiments of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
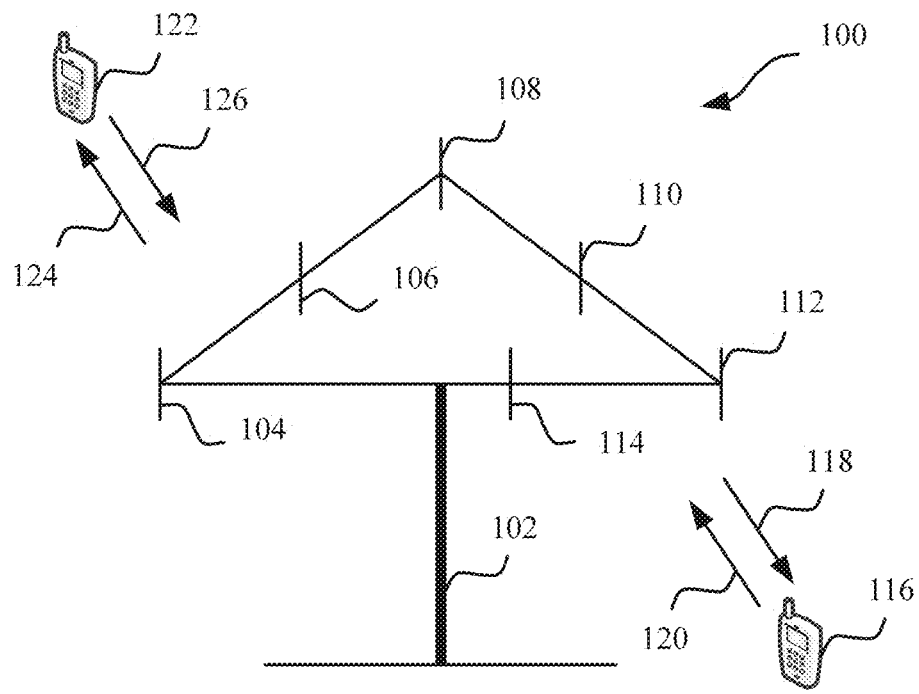
FIG. 1 is a schematic architecture diagram of an application scenario according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

It should be understood that, the technical solutions in the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

Particularly, the technical solutions in the embodiments of the present disclosure may be applied to various communications systems that are based on a non-orthogonal multiple access technology, for example, a sparse code multiple access (SCMA) system and a low density signature (LDS) system. Certainly, the SCMA system and the LDS system may be referred to as other names in the communications field. Further, the technical solutions in the embodiments of the present disclosure may be applied to a multi-carrier transmission system that uses the non-orthogonal multiple access technology, for example, an orthogonal frequency division multiplexing (OFDM) system, a filter bank multi-carrier (FBMC) system, a generalized frequency division multiplexing (GFDM) system, and a filtered orthogonal frequency division multiplexing (F-OFDM) system that use the non-orthogonal multiple access technology. It should be understood that, in the embodiments of the present disclosure, only a communications system that uses an SCMA technology is used as an example for description, but the embodiments of the present disclosure are not limited thereto.

It should be further understood that, in the embodiments of the present disclosure, a terminal device may communicate with one or more core networks by using a radio access network (RAN), and the terminal device may be referred to as an access terminal, user equipment (UE), a subscriber unit, a subscriber station, a mobile station, a remote station, a remote terminal, a mobile device, a user terminal, a terminal, radio communications equipment, a user agent, or a user apparatus. The access terminal may be a cellular phone, a cordless telephone set, a Session Initiation Protocol (SIP) phone, a wireless local loop (WLL) station, a personal digital assistant (PDA), a handheld device that has a wireless communication function, a computing device, another processing device that is connected to a wireless modem, a vehicle-mounted device, a wearable device, or a terminal device in a future 5G network.

It should be further understood that, in the embodiments of the present disclosure, a network device may be configured to communicate with the terminal device, and the network device may be a base transceiver station (BTS) in a GSM or CDMA system, or a NodeB (NB) in a WCDMA system, or an evolved NodeB (eNB or eNodeB) in an LTE system; or the network device may be a relay station, an access point, a vehicle-mounted device, a wearable device, a base station device in a future 5G network, or the like.

FIG. 1 shows a schematic architecture diagram of a communications system applied to an embodiment of the present disclosure. As shown in FIG. 1, a communications system 100 may include a network device 102, the network device 102 may include one or more antenna groups, and each antenna group may include one or more antennas. For example, one antenna group may include antennas 104 and 106, another antenna group may include antennas 108 and 110, and an additional group may include antennas 112 and 114. Although two antennas are shown for each antenna group in FIG. 1, it should be understood that each antenna group may have more antennas or fewer antennas. The network device 102 may additionally include a transmitter chain and a receiver chain. Persons of ordinary skill in the art may understand that the transmitter chain and the receiver chain each may include multiple components (for example, a processor, a modulator, a multiplexer, a demodulator, a demultiplexer, and an antenna) related to signal sending and receiving.

The network device 102 may communicate with multiple terminal devices (for example, a terminal device 116 and a terminal device 122). However, it may be understood that the network device 102 may communicate with any quantity of terminal devices that are similar to the terminal device 116 or 122. For example, the terminal devices 116 and 122 may be cellular phones, smartphones, portable computers, handheld communications devices, handheld computing devices, satellite radio apparatuses, devices related to the Global Positioning System, PDAs, and/or any other suitable devices configured to communicate in the wireless communications system 100.

As shown in FIG. 1, the terminal device 116 communicates with the antennas 112 and 114. The antennas 112 and 114 send information to the terminal device 116 by using a forward link 118 and receive information from the terminal device 116 by using a reverse link 120. In addition, the terminal device 122 communicates with the antennas 104 and 106. The antennas 104 and 106 send information to the terminal device 122 by using a forward link 124 and receive information from the terminal device 122 by using a reverse link 126.

For example, in a frequency division duplex (FDD) system, the forward link 118 may use a frequency band different from that of the reverse link 120, and the forward link 124 may use a frequency band different from that of the reverse link 126. For another example, in a time division duplex (TDD) system and a full-duplex system, the forward link 118 and the reverse link 120 may use a common frequency band, and the forward link 124 and the reverse link 126 may also use a common frequency band.

Each antenna group or each area or both designed for communication are referred to as sectors of the network device 102. For example, the antenna group may be designed to communicate with a terminal device in a sector in a coverage area of the network device 102. In a process in which the network device 102 respectively communicates with the terminal devices 116 and 122 by using the forward links 118 and 124, a transmit antenna of the terminal device 102 may increase signal-to-noise ratios of the forward links 118 and 124 by means of beamforming. In addition, compared with a manner in which a network device sends, by using a single antenna, signals to all terminal devices of the network device, when the network device 102 sends, by means of beamforming, signals to the terminal devices 116 and 122 that are randomly scattered in the related coverage area, less interference is caused to a mobile device in a neighboring cell.

At a given time, the network device 102, the terminal device 116, or the terminal device 122 may be a wireless communications sending apparatus or a wireless communications receiving apparatus. When sending data, the wireless communications sending apparatus may encode the data for transmission. Specifically, the wireless communications sending apparatus may obtain (for example, generate, receive, or store) a specific quantity of data bits that need to be sent to the wireless communications receiving apparatus by using a channel. The data bits may be included in a transport block (or multiple transport blocks) of data, and the transport block may be segmented to generate multiple code blocks.

It should be understood that, the communications system is a non-orthogonal multiple access system. For example, the system is an SCMA system, the network device is a base station, and the terminal device is user equipment. In this embodiment of the present disclosure, only the SCMA system, the base station, and the user equipment are used as examples for description, but the present disclosure is not limited thereto.

Figure 2:
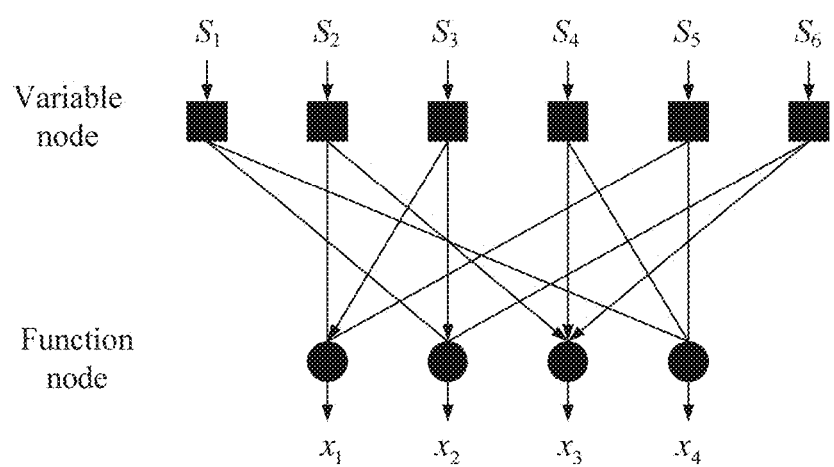
FIG. 2 is a schematic encoding principle diagram of an application scenario according to an embodiment of the present disclosure.

FIG. 1 shows the communications system applied to this embodiment of the present disclosure. For example, the communications system is the SCMA system. With reference to FIG. 2, the following briefly describes an encoding principle of a transmit end of a non-orthogonal multiple access system of the SCMA system.

As shown in FIG. 2, an example in which six data flows are multiplexed by using four resource units is used for description, that is, M=6, and N=4. M is a positive integer, and represents a quantity of data flows; and N is a positive integer, and represents a quantity of resource units. One resource unit may be one subcarrier, one resource element (RE), or one antenna port. The six data flows form one packet, and the four resource units form one code unit.

In a bipartite graph shown in FIG. 2, if there is a line between a data flow and a resource unit, it indicates that a non-zero modulation symbol is sent on the resource unit after codeword mapping is performed on at least one data combination of the data flow, and if there is no line between a data flow and a resource unit, it indicates that all modulation symbols that are sent on the resource unit after codeword mapping is performed on all possible data combinations of the data flow are zero modulation symbols. The data combination of the data flow may be understood according to the following description. For example, in a binary bit data flow, 00, 01, 10, and 11 are all possible data combinations of two-bit data. For ease of description, s1 to s6 are used to sequentially represent to-be-sent data combinations of the six data flows in the bipartite graph, and x1 to x4 are used to sequentially represent modulation symbols sent on the four resource units in the bipartite graph.

It may be learned from the bipartite graph that, modulation symbols are sent on two or more resource units after codeword mapping is performed on a data combination of each data flow, and a modulation symbol sent on each resource unit is obtained by superposing modulation symbols obtained after codeword mapping is separately performed on data combinations of two or more data flows. For example, non-zero modulation symbols may be sent on a resource unit 1 and a resource unit 2 after codeword mapping is performed on a to-be-sent data combination s3 of a data flow 3, and a modulation symbol x3 sent on a resource unit 3 is obtained by superposing non-zero modulation symbols obtained after codeword mapping is separately performed on to-be-sent data combinations s2, s4, and s6 of a data flow 2, a data flow 4, and a data flow 6. Because a quantity of data flows may be greater than a quantity of resource units, the non-orthogonal multiple access system can effectively improve a network capacity, including a quantity of accessible users, frequency spectrum efficiency, and the like of the system.

With reference to FIG. 1 and FIG. 2, the foregoing describes the application scenario and the encoding principle in the embodiments of the present disclosure. With reference to FIG. 3 to FIG. 6, the following describes a downlink control information transmission method according to an embodiment of the present disclosure from a perspective of a network device.

Figure 3:
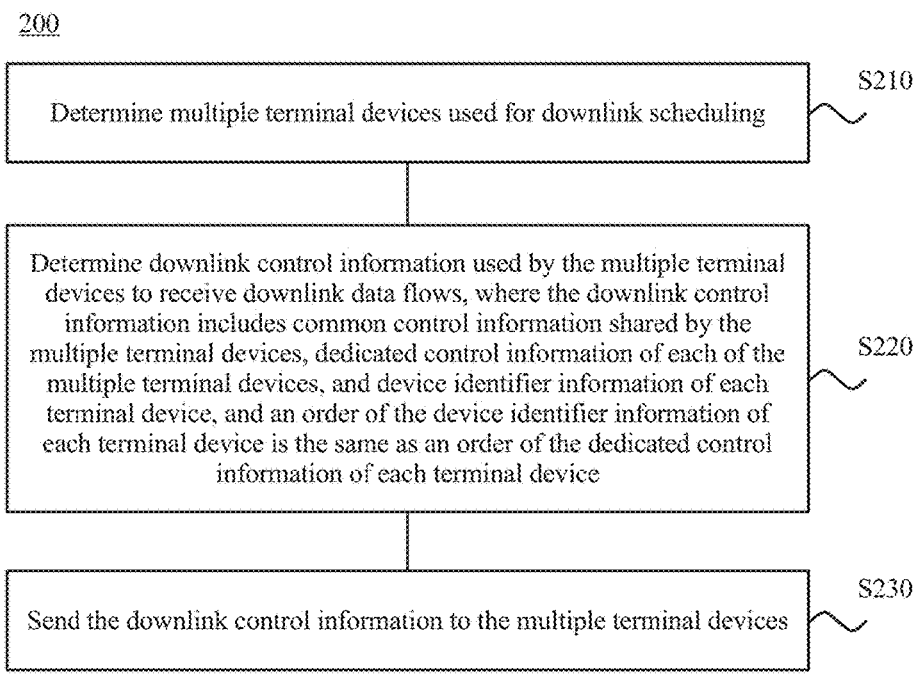
FIG. 3 is a schematic flowchart of a downlink control information transmission method according to an embodiment of the present disclosure.

FIG. 3 shows a downlink control information transmission method 200 according to an embodiment of the present disclosure. For example, the method 200 may be executed by a network device, and the network device is, for example, a base station. As shown in FIG. 3, the method 200 includes the following steps.

S210. Determine multiple terminal devices used for downlink scheduling.

S220. Determine downlink control information used by the multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device.

S230. Send the downlink control information to the multiple terminal devices.

That is, in this embodiment of the present disclosure, based on information such as a current channel state, a network device may determine two or more terminal devices used for current downlink scheduling, and therefore, may determine downlink control information that needs to be delivered to these terminal devices, so that these terminal devices can receive, according to the downlink control information, downlink data flows sent by the network device.

In this embodiment of the present disclosure, a network device may set same parts in control information of terminal devices as common control information shared by the terminal devices, and send the common control information together with dedicated control information of each terminal device to these terminal devices, so as to avoid repeatedly sending the common control information to each terminal device, thereby reducing system overheads. In addition, the downlink control information sent by the network device to the multiple terminal devices further includes device identifier information of each terminal device, so as to indicate objects to which the downlink control information is sent. An order of the device identifier information of each terminal device in the downlink control information is the same as an order of the dedicated control information of each terminal device, so as to imply the dedicated control information of each terminal device and avoid a case in which the network device separately indicates the corresponding dedicated control information to each terminal device, thereby further reducing the system overheads.

Therefore, in the downlink control information transmission method in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, in the downlink control information transmission method in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

In addition, downlink control information according to this embodiment of the present disclosure may include only common control information, dedicated control information of each terminal device, and device identifier information of each terminal device, but does not need to include group identifier information of a scheduled group including multiple terminal devices, so as to avoid an additional increase of system overheads that is caused by adding the group identifier information and also avoid a decrease of system scheduling flexibility that is caused by using the group identifier information.

Specifically, in S210, based on current channel state information, resource occupation information, and the like, the network device may determine the multiple terminal devices used for downlink scheduling, and the multiple terminal devices may perform spatial multiplexing at the same time or may use a same time-frequency resource set and the like.

In S220, the network device may determine the downlink control information used by the multiple terminal devices to receive downlink data flows, where the downlink control information includes the common control information shared by the multiple terminal devices, the dedicated control information of each of the multiple terminal devices, and the device identifier information of each terminal device, and the order of the device identifier information of each terminal device is the same as the order of the dedicated control information of each terminal device.

Specifically, in this embodiment of the present disclosure, assuming that orders of device identifier information of three terminal devices T1, T2, and T3 in the downlink control information are sequentially 2, 3, and 1, orders of dedicated control information of the three terminal devices in the downlink control information are also 2, 3, and 1. Therefore, each terminal device may determine the dedicated control information of the terminal device according to the order. For example, the terminal device T1 may determine that dedicated control information of the terminal device T1 is the second dedicated control information in the downlink control information.

It should be understood that, in this embodiment of the present disclosure, the common control information, the dedicated control information, and the device identifier information may be carried in the downlink control information according to a predetermined sorting rule, and the information may have one or more predetermined lengths, but the present disclosure is not limited thereto. For example, dedicated control information of the terminal devices may be carried in the downlink control information in a centralized manner or may be carried in the downlink control information in a scattered manner.

In this embodiment of the present disclosure, optionally, the common control information includes at least one of the following information: resource allocation information of time-frequency resources for carrying downlink data flows of the multiple terminal devices, or precoding matrix information or non-orthogonal multiple access codebook information for sending downlink data flows of the multiple terminal devices.

For example, the resource allocation information may include information about time-frequency resources occupied by these terminal devices, a resource allocation manner, or the like. The precoding matrix information may include information indicating a precoding matrix shared by these terminal devices. For example, the precoding matrix information may include an index and the like of the precoding matrix shared by these terminal devices. The non-orthogonal multiple access codebook information may include information indicating a non-orthogonal multiple access codebook, a non-orthogonal multiple access codebook set, a non-orthogonal multiple access matrix, and the like that are used by these terminal devices, for example, information about a codebook set including multiple codebooks, information about a codebook cluster including multiple codebook sets, feature sequence information, and feature matrix information. Specifically, for example, the non-orthogonal multiple access codebook information may include an index of the non-orthogonal multiple access matrix shared by these terminal devices, an index of an SCMA feature matrix, or the like.

It should be understood that a codeword may be represented by a multidimensional complex number vector, the multidimensional complex number vector has two or more dimensions and is used to represent a mapping relationship between data and two or more modulation symbols, the modulation symbol includes at least one zero modulation symbol and at least one non-zero modulation symbol, and the data may be binary bit data or multivariate data.

It should be further understood that a codebook includes two or more codewords. The codebook may represent a mapping relationship between a codeword in the codebook and a possible data combination of data of a specific length.

It should be further understood that, a feature sequence is corresponding to a codebook and includes an element zero and an element one, the element zero indicates that all elements that are of codewords in the corresponding codebook and that are in corresponding locations of the element zero are zero, and the element one indicates that not all elements or none of elements that are of codewords in the corresponding codebook and that are in corresponding locations of the element one are zero. It should be further understood that, a feature matrix includes two or more feature sequences.

It should be understood that, in this embodiment of the present disclosure, only an example in which a non-orthogonal multiple access system includes an SCMA system is used for description, but the present disclosure is not limited thereto. An SCMA technology is a non-orthogonal multiple access technology, and certainly, persons skilled in the art may not call this technology SCMA, and may call this technology another technical term. In the SCMA technology, multiple different data flows are transmitted on a same resource unit by using codebooks (that is, the multiple different data flows are multiplexed by using the same resource unit), and different codebooks are used for the different data flows, so as to improve resource utilization. The data flows may come from same user equipment or different user equipment.

A codeword may be represented by a multidimensional complex number vector, the multidimensional complex number vector has two or more dimensions and is used to represent a mapping relationship between data and two or more modulation symbols, the modulation symbol includes at least one zero modulation symbol and at least one non-zero modulation symbol, a relationship between the zero modulation symbol and the non-zero modulation symbol may be that a quantity of zero modulation symbols is not less than a quantity of non-zero modulation symbols, and the data may be binary bit data or multivariate data. A codebook includes two or more codewords. The codebook may represent a mapping relationship between a codeword in the codebook and a possible data combination of data of a specific length. In the SCMA technology, data in a data flow is directly mapped to a codeword, that is, a multidimensional complex number vector, in a codebook according to a specific mapping relationship, so that the data is extensively sent on multiple resource units. Herein, the data may be binary bit data or multivariate data, and the multiple resource units may be resource units in a time domain, a frequency domain, a space domain, a time-frequency domain, a time-space domain, or a time-frequency-space domain.

With reference to the foregoing description of the codeword, the codebook, and the bipartite graph shown in FIG. 2, the codeword in the codebook generally has the following form:

$$\begin{pmatrix} c_{1,q} \\ c_{2,q} \\ \vdots \\ c_{N,q} \end{pmatrix},$$

where $1 \leq q \leq Q_m$.

A codebook including two or more codewords generally has the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\},$$

where

N is a positive integer greater than 1, and may represent a quantity of resource units included in one code unit, or may be considered as a length of a codeword; $Q_m$ is a positive integer greater than 1, represents a quantity of codewords included in a codebook, and is corresponding to a modulation order; and q is a positive integer, and $1 \leq q \leq Q_m$. For example, during quadrature phase shift keying (Quadrature Phase Shift Keying, "QPSK" for short) or 4-order modulation, a value of $Q_m$ is 4.

An element $c_{n,q}$ included in a codebook and a codeword is a complex number, and may be mathematically expressed as $c_{n,q} = \alpha * \exp(j * \beta)$, $1 \leq n \leq N$, $1 \leq q \leq Q_m$, where $\alpha$ and $\beta$ may be any real numbers. There may be a specific mapping relationship between a codeword in a codebook and a data combination of a data flow. For example, there may be the following mapping relationship between codewords in a codebook and two-bit data combinations of a binary data flow: "00" may be mapped to a codeword 1, "01" may be mapped to a codeword 2, "10" may be mapped to a codeword 3, and "11" may be mapped to a codeword 4. The codeword 1, the codeword 2, the codeword 3, and the codeword 4 may be respectively expressed as:

codeword 1

$$\begin{pmatrix} c_{1,q} \\ c_{2,q} \\ \vdots \\ c_{N,q} \end{pmatrix},$$

codeword 2

$$\begin{pmatrix} c_{1,2} \\ c_{2,2} \\ \vdots \\ c_{N,2} \end{pmatrix},$$

codeword 3

$$\begin{pmatrix} c_{1,3} \\ c_{2,3} \\ \vdots \\ c_{N,3} \end{pmatrix},$$

and codeword 4

$$\begin{pmatrix} c_{1,4} \\ c_{2,4} \\ \vdots \\ c_{N,4} \end{pmatrix}.$$

With reference to the foregoing bipartite graph, when there is a line between a data flow and a resource unit, a codebook corresponding to the data flow and a codeword in the codebook need to have the following characteristic: For at least one codeword in the codebook, a non-zero modulation symbol is sent on a corresponding resource unit. For example, if there is a line between a data flow and a resource unit 1, at least one codeword in a codebook corresponding to the data flow 3 meets $c_{1,q} \ne 0$, where $1 \le q \le Q_m$. When there is no line between a data flow and a resource unit, a codebook corresponding to the data flow and a codeword in the codebook need to have the following characteristic: For all codewords in the codebook, zero modulation symbols are sent on a corresponding resource unit. For example, if there is no line between a data flow 3 and a resource unit 3, any codeword in a codebook corresponding to the data flow 3 meets $c_{3,q}=0$, where $1 \le q \le Q_m$.

In conclusion, when a modulation is QPSK, the codebook corresponding to the data flow 3 in the foregoing bipartite graph may have the following form and characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q} = \alpha * \exp(j*\beta)$, $1 \le n \le N$, $1 \le q \le Q_m$, where $\alpha$ and $\beta$ may be any real numbers; for any q, $1 \le q \le 4$; $c_{1,q}$ and $c_{2,q}$ are not both zero; and at least q1 and q2 meet the following condition: $c_{1,q_1} \ne 0$, $c_{2,q_2} \ne 0$, $1 \le q1 \le 4$, and $1 \le q2 \le 4$. For example, if a data combination s3 of the data flow 3 shown in FIG. 2 is "10", a codeword to which the data combination s3 is mapped according to the foregoing mapping rule is a four-dimensional complex number vector:

$$\begin{pmatrix} c_{1,3} \\ c_{2,3} \\ 0 \\ 0 \end{pmatrix}.$$

In the non-orthogonal multiple access system, the bipartite graph shown in FIG. 2 may be represented by a feature matrix. The feature matrix may have the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m}$ represents an element in the feature matrix, m and n are natural numbers, $1 \le n \le N$, $1 \le m \le M$, N represents a quantity of resource units in one code unit, and M represents a quantity of multiplexed data flows in one packet. Although the feature matrix may be expressed in a common form, the feature matrix may have the following characteristics:

(1) For the element $r_{n,m}$ in the feature matrix, $r_{n,m} \in \{0,1\}$, $1 \le n \le N$, $1 \le m \le M$. According to a corresponding bipartite graph, $r_{n,m}=1$ may mean that there is a line between an $m^{th}$ data flow and an $n^{th}$ resource unit; or certainly, $r_{n,m}=1$ may mean that a non-zero modulation symbol is sent on an $n^{th}$ resource unit after codeword mapping is performed on at least one data combination of the $m^{th}$ data flow. According to a corresponding bipartite graph, $r_{n,m}=0$ may mean that there is no line between an $m^{th}$ data flow and an $n^{th}$ resource unit; or certainly, $r_{n,m}=0$ may mean that zero modulation symbols are sent on the $n^{th}$ resource unit after codeword mapping is performed on all possible data combinations of the $m^{th}$ data flow.

(2) Further, optionally, a quantity of elements zero is not less than a quantity of elements one in the feature matrix, so as to reflect a characteristic of sparse coding.

In addition, a column of the feature matrix may be referred to as a feature sequence, and the feature sequence may be expressed in the following form:

$$\begin{pmatrix} r_{1,m} \\ r_{2,m} \\ \vdots \\ r_{N,m} \end{pmatrix}, 1 \le m \le M.$$

Therefore, the feature matrix may also be considered as a matrix including a series of feature sequences.

With reference to the foregoing characteristic description of the feature matrix, for the example provided in FIG. 2, a corresponding feature matrix may be expressed as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A feature sequence corresponding to a codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used for the data flow 3 in FIG. 2 may be expressed as $$\begin{pmatrix} 1 \\ 1 \\ 0 \\ 0 \end{pmatrix}.$$

Therefore, it may be considered that, codebooks are in a one-to-one correspondence with feature sequences, that is, one codebook is uniquely corresponding to one feature sequence; however, there may be a one-to-many correspondence between feature sequences and codebooks, that is, one feature sequence may be corresponding to one or more codebooks. Therefore, the feature sequence may be considered to have the following characteristics: The feature sequence is corresponding to one or more codebooks, each feature sequence includes an element zero and an element one, the element zero indicates that all modulation symbols that are of all codewords in a corresponding codebook and that are in corresponding locations of the element zero are zero modulation symbols, and the element one indicates that all modulation symbols that are of all codewords in a corresponding codebook and that are in corresponding locations of the element one are not zero modulation symbols or are non-zero modulation symbols.

A correspondence between a feature sequence and a codebook may be determined according to the following two conditions:

(1) A total quantity of modulation symbols of codewords in the codebook is the same as a total quantity of elements in the corresponding feature sequence.

(2) For any element one in the feature sequence, at least one codeword can be found in the corresponding codebook, and a modulation symbol of the codeword in a location of the element one is not a zero modulation symbol; and for any element zero in the feature sequence, all modulation symbols that are of all codewords in the corresponding codebook and that are in corresponding locations of the element zero are zero modulation symbols.

Therefore, in this embodiment of the present disclosure, a codebook includes two or more codewords, the codeword is a multidimensional complex number vector that is used to represent a mapping relationship between data and at least two modulation symbols, and the at least two modulation symbols include at least one zero modulation symbol and at least one non-zero modulation symbol. Each feature matrix includes two or more feature sequences, and each feature matrix is corresponding to one or more codebooks. Each feature sequence is also corresponding to one or more codebooks, the feature sequence includes an element zero and an element one, the element zero indicates that all modulation symbols that are of all codewords in a corresponding codebook and that are in corresponding locations of the element zero are zero modulation symbols, and the element one indicates that all modulation symbols that are of all codewords in a corresponding codebook and that are in corresponding locations of the element one are not zero modulation symbols or are non-zero modulation symbols.

In this embodiment of the present disclosure, multiple codebooks may be classified into one or more codebook clusters, and each codebook cluster may include one or more codebooks. Any two codebooks in a same codebook cluster, for example, a codebook a and a codebook b have the following characteristic: Codewords in the codebook a and codewords in the codebook b have a same total quantity of modulation symbols. Therefore, the codebook in the codebook cluster meets a requirement that all codewords have a same total quantity of modulation symbols, that is, lengths of all the codewords are the same, or quantities of resource units used to multiplex data flows are the same.

In this embodiment of the present disclosure, multiple codebooks may be classified into one or more codebook sets, and each codebook set may include one or more codebooks. Any two codebooks in a same codebook set, for example, a codebook c and a codebook d have the following characteristics: (1) Codewords in the codebook c and codewords in the codebook d have a same total quantity of modulation symbols. (2) In locations in which all modulation symbols of all the codewords in the codebook c are zero modulation symbols, all modulation symbols of all the codewords in the codebook d are also zero modulation symbols.

FIG. 2 is still used as an example for description, and it is assumed that a modulation is QPSK. A codebook used for a data flow 1 in FIG. 2 may be represented by a codebook 1, the codebook used for the data flow 3 may be represented by a codebook 3, and the codebook 1 and the codebook 3 may be respectively expressed as:

codebook 1

$$\left\{ \begin{pmatrix} 0 \\ e_{2,1} \\ 0 \\ e_{4,1} \end{pmatrix}, \begin{pmatrix} 0 \\ e_{2,2} \\ 0 \\ e_{4,2} \end{pmatrix}, \begin{pmatrix} 0 \\ e_{2,3} \\ 0 \\ e_{4,3} \end{pmatrix}, \begin{pmatrix} 0 \\ e_{2,4} \\ 0 \\ e_{4,4} \end{pmatrix} \right\}$$

and codebook 3

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $e_{n,q}=\alpha^*\exp(j^*\beta)$, $n\in\{2,4\}$, $1\leq q\leq 4$, where $\alpha$ and $\beta$ may be any real numbers; for any q, $1\leq q\leq 4$; $e_{2,q}$ and $e_{4,q}$ are not both zero; and at least q1 and q2 meet the following condition: $e_{2,q_1}\neq 0$, $e_{4,q_2}\neq 0$, $1\leq q1\leq 4$, and $1\leq q2\leq 4$.

All modulation symbols, in a location 3 (corresponding to a third resource unit, n=3), of all codewords in the codebook 1 are zero modulation symbols, and all modulation symbols, in the location 3, of all codewords in the codebook 3 are also zero modulation symbols. However, all modulation symbols, in a location 1 (corresponding to a first resource unit, n=1), of all the codewords in the codebook 1 are zero modulation symbols, but not all modulation symbols, in the location 1, of all the codewords in the codebook 3 are zero modulation symbols. Therefore, the codebook 1 and the codebook 3 do not belong to a same codebook set.

For another example, a codebook 2 having the following characteristic may be expressed as:

codebook 2

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\},$$

where $d_{n,q}=\alpha*\exp(j*\beta)$, $1\leq n\leq 2$, $1\leq q\leq 4$, where $\alpha$ and $\beta$ may be any real numbers; for any q, $1\leq q\leq 4$; $d_{1,q}$ and $d_{2,q}$ are not both zero; and at least q1 and q2 meet the following condition: $d_{1,q_1}\neq 0$, $d_{2,q_2}\neq 0$, $1\leq q1\leq 4$, and $1\cdot q2\leq 4$.

All modulation symbols, in locations 1 and 2 (corresponding to a first resource unit and a second resource unit, n=1, 2), of all codewords in a codebook 2 are zero modulation symbols, and all modulation symbols, in the locations 1 and 2, of all the codewords in the codebook 3 are also zero modulation symbols. In addition, all the modulation symbols of all the codewords in the codebook 2 are zero modulation symbols only in the locations 1 and 2, and all the modulation symbols of all the codewords in the codebook 3 are also zero modulation symbols only in the locations 1 and 2. That is, locations in which all the modulation symbols of all the codewords in the codebook 2 are zero modulation symbols are the same as locations in which all the modulation symbols of all the codewords in the codebook 3 are zero modulation symbols, and both are the location 1 and the location 2. Therefore, the codebook 2 and the codebook 3 belong to a same codebook set.

In conclusion, in this embodiment of the present disclosure, each codebook cluster includes one or more codebook sets, each codebook set includes one or more codebooks, and each codebook includes two or more codewords. Each codebook cluster meets a requirement that codewords in a same codebook cluster have a same total quantity of modulation symbols, each codebook set meets a requirement that codewords in a same codebook set have a same total quantity of modulation symbols, and for any two codebooks in a same codebook set, locations in which all modulation symbols of all codewords are zero modulation symbols are the same.

It should be further understood that, in a non-orthogonal multiple access system, a codebook may be directly expressed and stored. For example, a codebook or each codeword in a codebook described above is directly stored, or only a modulation symbol that is of a codeword and that is in a location in which a corresponding feature sequence element is an element one is stored. Therefore, when the present disclosure is applied, it is required to assume that both a network device and a terminal device in the non-orthogonal multiple access system can store a part or all of the following pre-designed content:

(1) One or more feature matrices $$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N\times M},$$

where $r_{n,m}\in\{0,1\}$, $1\leq n\leq N$, $1\leq m\leq M$, and both M and N are positive integers greater than 1, M may represent a quantity of multiplexed data flows, and N may represent a quantity of resource units included in one code unit or may be considered as a length of a codeword.

(2) One or more feature sequences $$\begin{pmatrix} r_{1,m} \\ r_{2,m} \\ \vdots \\ r_{N,m} \end{pmatrix},$$

where $1\leq m\leq M$.

(3) One or more codebooks $$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m\geq 2$, $Q_m$ may represent a modulation order corresponding to the codebook, each codebook may be corresponding to one modulation order, and N is a positive integer greater than 1, and may represent a quantity of resource units included in one code unit or may be considered as a length of a codeword.

In this embodiment of the present disclosure, optionally, the dedicated control information of each terminal device includes hybrid automatic repeat request (HARQ) information and/or modulation and coding scheme (MCS) information of each terminal device.

In this embodiment of the present disclosure, the device identifier information of each terminal device may be, for example, cyclic redundancy check (CRC) scrambled by using a cell radio network temporary identifier (C-RNTI), and each C-RNTI may be corresponding to one terminal device.

It should be understood that, for example, the dedicated control information of each terminal device may further include configuration information of a transmit power control command, new data indication information, a data demodulation reference signal, or the like of the terminal device.

It should be understood that, in this embodiment of the present disclosure, the foregoing embodiment is used only as an example for describing specific information content that may be included in the common control information, the dedicated control information, and the device identifier information, but the present disclosure is not limited thereto. For example, the device identifier information may be CRC scrambled by using an RNTI exclusive to another terminal device, and the like. For another example, the downlink control information may further include other related modulation scheme information, coding scheme information, retransmission information, and the like.

In S230, the network device may send the downlink control information to the multiple terminal devices, for example, in a multicast manner, a broadcast manner, or the like.

Figure 4:
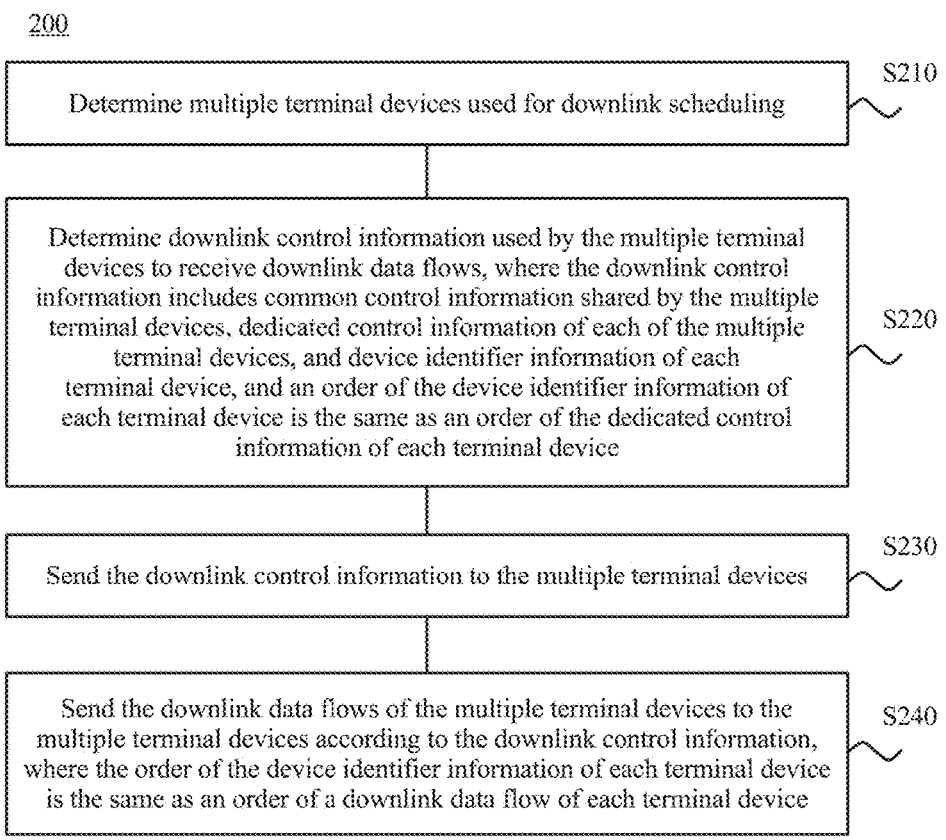
FIG. 4 is another schematic flowchart of a downlink control information transmission method according to an embodiment of the present disclosure.

In this embodiment of the present disclosure, optionally, as shown in FIG. 4, the method 200 further includes the following step.

S240. Send the downlink data flows of the multiple terminal devices to the multiple terminal devices according to the downlink control information, where the order of the device identifier information of each terminal device is the same as an order of a downlink data flow of each terminal device.

Specifically, in this embodiment of the present disclosure, for example, the network device may determine, according to the common control information included in the downlink control information, the resource allocation information of the time-frequency resources for carrying the downlink data flows of the multiple terminal devices, and the like; and the network device may further determine, according to the dedicated control information and the device identifier information that are included in the downlink control information, matrix information, HARQ information, MCS information, and the like that are used by the terminal devices. Therefore, based on the information, the network device may send the downlink data flows of the multiple terminal devices to the multiple terminal devices.

It should be understood that, the network device may send the downlink data flow to the terminal device by using a method in the prior art and based on the downlink control information, but this embodiment of the present disclosure is not limited thereto. However, it should be further understood that, in this embodiment of the present disclosure, when the network device sends the downlink data flows of the multiple terminal devices to the multiple terminal devices, the order of the device identifier information of each terminal device is the same as the order of the downlink data flow of each terminal device.

That is, in this embodiment of the present disclosure, the order of the device identifier information of each terminal device may be used to indicate not only a location of the dedicated control information of each terminal device in the downlink control information but also a location of the downlink data flow of each terminal device or transmission layer information of each terminal device. When there is a correspondence between the order of the downlink data flow of each terminal device and a column of a feature matrix or a precoding matrix used during transmission, the order of the device identifier information of each terminal device may further indicate the column of the feature matrix or the precoding matrix used by the terminal device during transmission.

It should be understood that, the network device may encode, according to the order of the downlink data flow of each terminal device, downlink data to be transmitted to each terminal device. Accordingly, the terminal device may perform, according to the order of the downlink data flow, decoding or the like on the downlink data transmitted by the network device.

Therefore, in the downlink control information transmission method in this embodiment of the present disclosure, an order of device identifier information of each terminal device in downlink control information is set to be the same as an order of a downlink data flow of each terminal device, so as to avoid a case in which a network device separately indicates corresponding downlink data flow information to each terminal device, thereby further reducing system overheads.

In an embodiment of the present disclosure, each terminal device has a same quantity of downlink data flows. For example, downlink data sent by the network device to each terminal device is transmitted by using one downlink data flow. For another example, downlink data sent by the network device to each terminal device is transmitted by using a preset quantity of downlink data flows, and a quantity of downlink data flows of each terminal device may be preconfigured, or the network device may notify each terminal device of a quantity of downlink data flows of each terminal device; for example, information about the quantity of downlink data flows of each terminal device may be included in the common control information shared by the multiple terminal devices. It should be understood that, in this embodiment of the present disclosure, this is used only as an example for description, but the present disclosure is not limited thereto.

It should be further understood that, in this embodiment of the present disclosure, the terminal devices may have different quantities of downlink data flows. When the terminal devices have different quantities of downlink data flows, the order of the device identifier information of each terminal device may be used to indicate a relative location or order of the downlink data flow of each terminal device, and each terminal device may further determine, with reference to the quantities of downlink data flows of the terminal devices, information such as a specific location of the downlink data flow delivered by the network device to the terminal device. The quantities of downlink data flows of the terminal devices may be pre-configured, or the network device may notify the terminal devices of the quantities of downlink data flows of the terminal devices; for example, information about the quantities of downlink data flows of the terminal devices may be respectively included in dedicated control information of the terminal devices.

Figure 5:
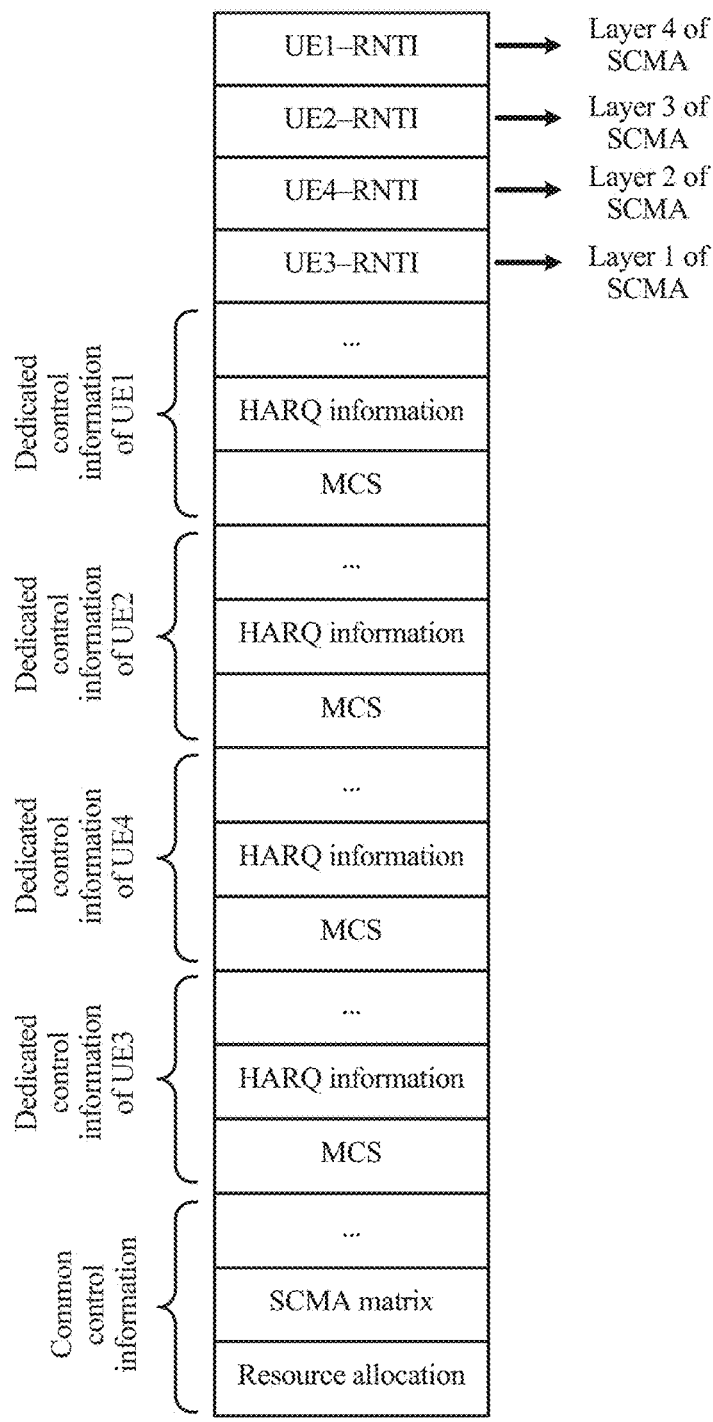
FIG. 5 is a schematic block diagram of downlink control information according to an embodiment of the present disclosure.
Figure 6:
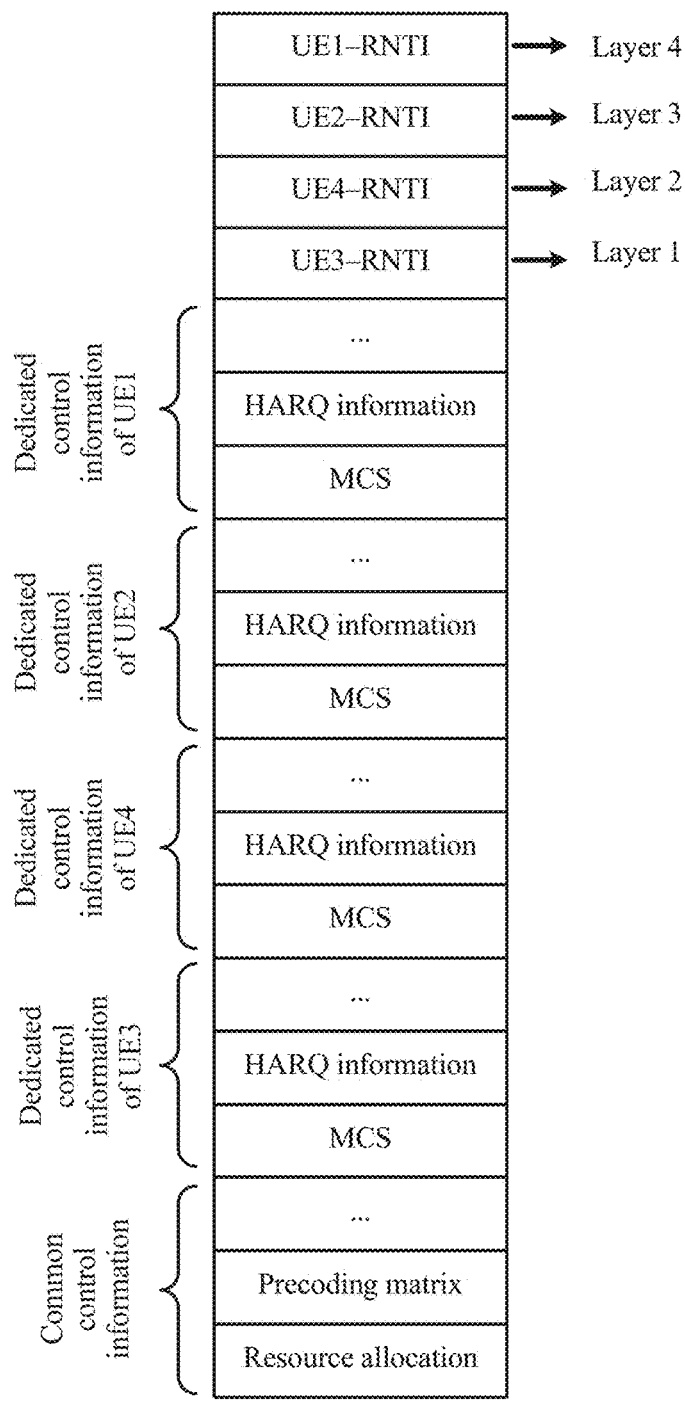
FIG. 6 is another schematic block diagram of downlink control information according to an embodiment of the present disclosure.

With reference to FIG. 5 and FIG. 6, the following separately uses an SCMA technology and a MU-MIMO technology as examples for detailed description.

For example, a multi-user access technology used by a system is the SCMA technology. It is assumed that a base station currently schedules four UEs to transmit data by using a same time-frequency resource, and these UEs are respectively referred to as UE1, UE2, UE3, and UE4. It is assumed that each UE uses one column, that is, one layer, of an SCMA matrix, and it is further assumed that correspondences between UEs and layer serial numbers are as follows: The UE3 is corresponding to a layer 1, the UE4 is corresponding to a layer 2, the UE2 is corresponding to a layer 3, and the UE1 is corresponding to a layer 4. Therefore, downlink control information sent by a network device to the UEs may have a structure shown in FIG. 5.

As shown in FIG. 5, the downlink control information includes common control information, dedicated control information of each UE, and device identifier information of each UE. The common control information includes information about the time-frequency resource occupied by these UEs, that is, resource allocation information, and includes information about the SCMA matrix shared by these UEs, for example, an index of the SCMA matrix. The dedicated control information of each UE includes HARQ information, MCS information, and the like of each UE. The device identifier information of each UE is an RNTI corresponding to each UE.

In the structure of the downlink control information shown in FIG. 5, the common control information, the dedicated control information, and the device identifier information are sequentially sorted, and orders of device identifier information of the UEs are sequentially the UE3, the UE4, the UE2, and the UE1. The orders are the same as orders of dedicated control information of the UEs in the downlink control information, and are also the same as orders of downlink data flows of the UEs. The orders further indicate information about columns of the SCMA matrix that are used by the UEs, that is, the UE3 uses the first column of the SCMA matrix, the UE4 uses the second column of the SCMA matrix, the UE2 uses the third column of the SCMA matrix, and the UE1 uses the fourth column of the SCMA matrix.

For another example, a multi-user access technology used by a system is the MU-MIMO technology, and downlink control information sent by a network device to UEs may have a structure shown in FIG. 6. The common control information includes information about time-frequency resources occupied by these UEs, that is, resource allocation information, and includes information about a precoding matrix shared by these UEs, for example, an index of the precoding matrix.

It should be understood that, in this embodiment of the present disclosure, in the non-orthogonal multiple access technology, multiple different data flows are transmitted on a same resource unit by using codebooks, that is, the multiple different data flows are multiplexed by using the same resource unit, and different codebooks are used for the different data flows, so as to improve resource utilization. The data flows may come from a same terminal device or different terminal devices.

A codeword may be represented by a multidimensional complex number vector, the complex number vector may have two or more dimensions and may be used to represent a mapping relationship between data and two or more modulation symbols, the modulation symbol includes at least one zero modulation symbol and at least one non-zero modulation symbol, and the data may be binary bit data or multivariate data. A codebook may include two or more codewords. The codebook may represent a mapping relationship between a codeword in the codebook and a possible data combination of data of a specific length.

Therefore, in the non-orthogonal multiple access technology, data in a data flow is directly mapped to a codeword, that is, a multidimensional complex number vector, in a codebook according to a specific mapping relationship, so that the data is extensively sent on multiple resource units. The data may be binary bit data or multivariate data, and the resource units may be resource units in a time domain, a frequency domain, a space domain, a time-frequency domain, a time-space domain, or a time-frequency-space domain.

Likewise, the order of the device identifier information of each terminal device may be used to indicate not only the location of the dedicated control information of each terminal device in the downlink control information but also the location of the downlink data flow of each terminal device or the transmission layer information of each terminal device. For example, it may be learned from FIG. 6 that, in the MU-MIMO technology, UE3 uses the first layer in space to transmit data, UE4 uses the second layer in the space to transmit data, UE2 uses the third layer in the space to transmit data, and UE1 uses the fourth layer in the space to transmit data.

Therefore, a terminal device may determine, according to whether there is device identifier information corresponding to the terminal device in downlink control information, whether downlink data needs to be received. If the terminal device determines that the downlink data needs to be received, the terminal device may further determine order information of the device identifier information of the terminal device, and therefore, the terminal device may determine dedicated control information of the terminal device from multiple pieces of dedicated control information in the downlink control information according to the order information. In addition, the terminal device may further determine, according to the order information, a downlink data flow of the terminal device from multiple downlink data flows sent by a network device, and corresponding encoding information, for example, a serial number of a column that is of an SCMA matrix or a precoding matrix and that is used by the terminal device.

It should be understood that, the foregoing describes only possible specific applications of this embodiment of the present disclosure to the SCMA technology and the MU-MIMO technology, but the present disclosure is not limited thereto. The downlink control information according to this embodiment of the present disclosure may further have another structure, and may include other content.

It should be further understood that, in embodiments of the present disclosure, serial numbers of the foregoing processes do not mean execution sequences. The execution sequences of the processes should be determined according to functions and internal logic of the processes, and should not be construed as any limitation on implementation processes of the embodiments of the present disclosure.

Therefore, in the downlink control information transmission method in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, in the downlink control information transmission method in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, in the downlink control information transmission method in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

Figure 7:
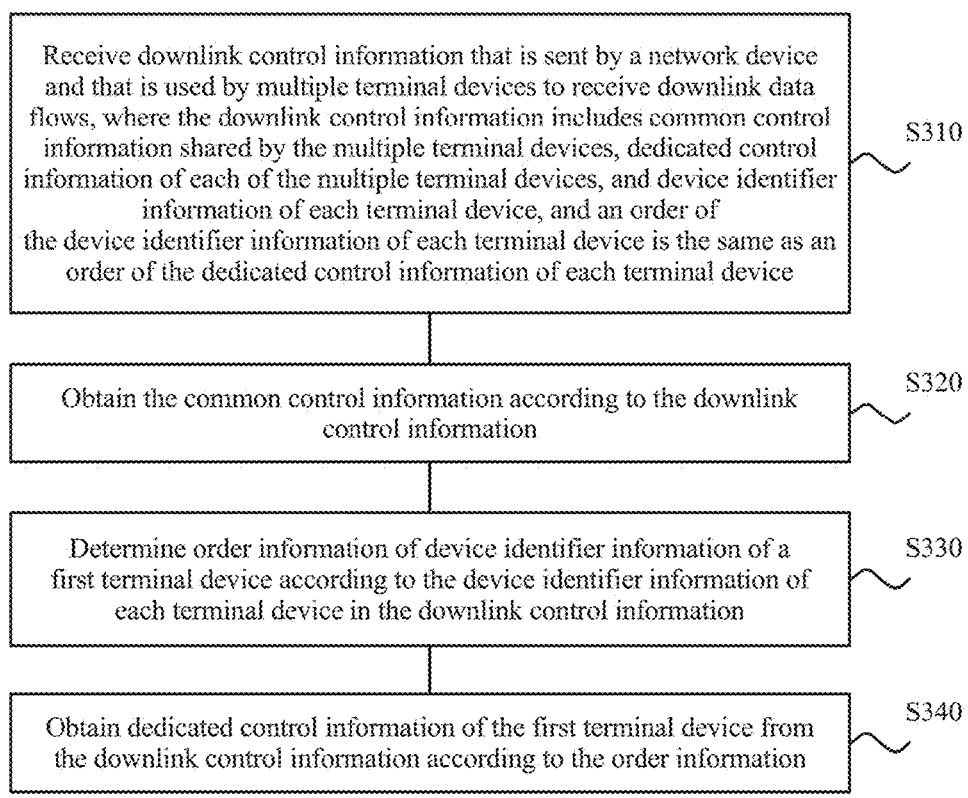
FIG. 7 is a schematic flowchart of a downlink control information transmission method according to another embodiment of the present disclosure.
Figure 8:
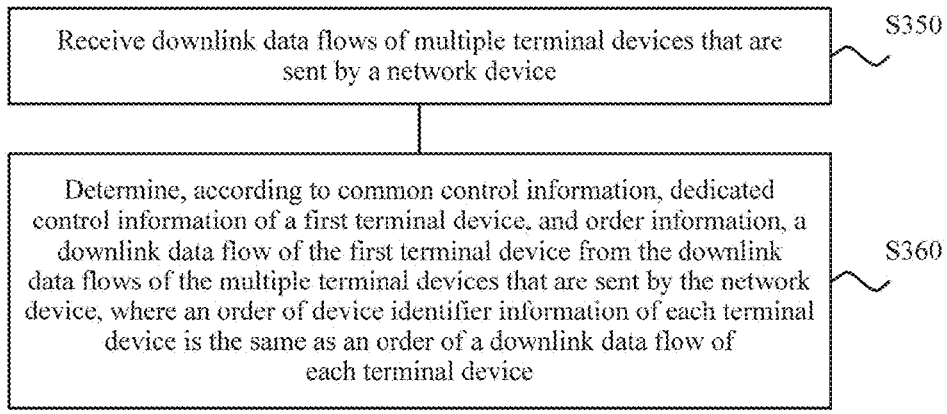
FIG. 8 is another schematic flowchart of a downlink control information transmission method according to another embodiment of the present disclosure.

With reference to FIG. 3 to FIG. 6, the foregoing describes in detail the downlink control information transmission method according to the embodiment of the present disclosure from the perspective of the network device. With reference to FIG. 7 and FIG. 8, the following describes a downlink control information transmission method according to an embodiment of the present disclosure from a perspective of a terminal device.

As shown in FIG. 7, for example, a downlink control information transmission method 300 according to an embodiment of the present disclosure may be executed by a terminal device in a communications system. For example, the terminal device is user equipment. As shown in FIG. 7, the method 300 includes the following steps.

S310. Receive downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device.

S320. Obtain the common control information according to the downlink control information.

S330. Determine order information of device identifier information of a first terminal device according to the device identifier information of each terminal device in the downlink control information.

S340. Obtain dedicated control information of the first terminal device from the downlink control information according to the order information.

Specifically, for example, after receiving the downlink control information, the first terminal device may obtain the common control information from the downlink control information, and may further determine the dedicated control information of the first terminal device from dedicated control information of the terminal devices according to the order of the device identifier information of the first terminal device in device identifier information of the terminal devices.

Therefore, in the downlink control information transmission method in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, in the downlink control information transmission method in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

In this embodiment of the present disclosure, optionally, as shown in FIG. 8, after the downlink control information sent by the network device is received, the method 300 further includes the following steps:

S350. Receive downlink data flows of the multiple terminal devices that are sent by the network device.

S360. Determine, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

It should be understood that, in S360, the first terminal device may detect or determine, by using a method in the prior art and according to the common control information and the dedicated control information of the first terminal device, the downlink data flow sent by the network device, but this embodiment of the present disclosure is not limited thereto. It should be further understood that, in this embodiment of the present disclosure, the first terminal device further needs to determine, with reference to the order information and based on a rule that the order of the device identifier information of each terminal device is the same as the order of the downlink data flow of each terminal device, the downlink data flow of the first terminal device from the downlink data flows of the multiple terminal devices that are sent by the network device.

In this embodiment of the present disclosure, optionally, each terminal device has a same quantity of downlink data flows.

In this embodiment of the present disclosure, optionally, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

In this embodiment of the present disclosure, optionally, the dedicated control information of each terminal device includes hybrid automatic repeat request HARQ information and/or modulation and coding scheme MCS information of each terminal device.

It should be understood that, interaction between the network device and the terminal device, related characteristics, functions, and the like that are described from the perspective of the network device are corresponding to those that are described from the perspective of the terminal device. For brevity, details are not described herein again.

It should be further understood that, in embodiments of the present disclosure, serial numbers of the foregoing processes do not mean execution sequences. The execution sequences of the processes should be determined according to functions and internal logic of the processes, and should not be construed as any limitation on implementation processes of the embodiments of the present disclosure.

Therefore, in the downlink control information transmission method in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, in the downlink control information transmission method in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, in the downlink control information transmission method in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

With reference to FIG. 3 to FIG. 8, the foregoing describes in detail the downlink control information transmission methods according to the embodiments of the present disclosure. With reference to FIG. 9 to FIG. 14, the following describes downlink control information transmission apparatuses according to embodiments of the present disclosure. Technical features described in the method embodiments may be applied to the following apparatus embodiments.

Figure 9:
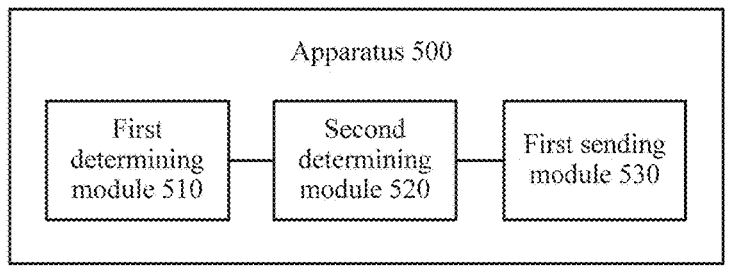
FIG. 9 is a schematic block diagram of a downlink control information transmission apparatus according to an embodiment of the present disclosure.

FIG. 9 shows a downlink control information transmission apparatus 500 according to an embodiment of the present disclosure. As shown in FIG. 9, the apparatus 500 includes:

a first determining module 510, configured to determine multiple terminal devices used for downlink scheduling;

a second determining module 520, configured to determine downlink control information used by the multiple terminal devices, which are determined by the first determining module 510, to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device; and a first sending module 530, configured to send the downlink control information determined by the second determining module 520 to the multiple terminal devices.

Therefore, according to the downlink control information transmission apparatus in this embodiment of the present disclosure, the apparatus sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the apparatus separately indicates the corresponding dedicated control information to each terminal device, thereby further reducing the system overheads.

Figure 10:
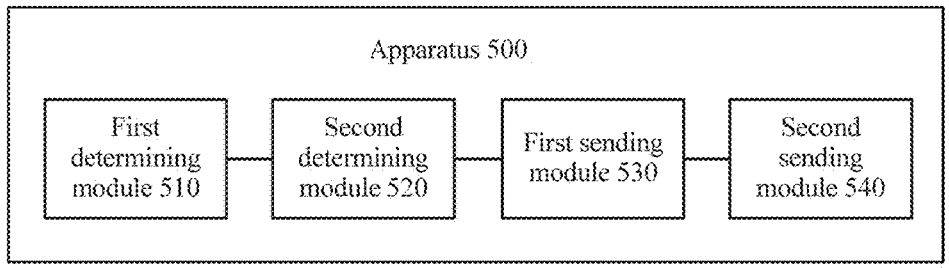
FIG. 10 is another schematic block diagram of a downlink control information transmission apparatus according to an embodiment of the present disclosure.

In this embodiment of the present disclosure, optionally, as shown in FIG. 10, the apparatus 500 further includes:

a second sending module 540, configured to send the downlink data flows of the multiple terminal devices to the multiple terminal devices according to the downlink control information, where the order of the device identifier information of each terminal device is the same as an order of a downlink data flow of each terminal device.

In this embodiment of the present disclosure, optionally, each terminal device has a same quantity of downlink data flows that are sent by the second sending module 540.

In this embodiment of the present disclosure, optionally, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

In this embodiment of the present disclosure, optionally, the dedicated control information of each terminal device includes hybrid automatic repeat request HARQ information and/or modulation and coding scheme MCS information of each terminal device.

In this embodiment of the present disclosure, optionally, the apparatus 500 is a network device.

It should be understood that, the apparatus 500 according to this embodiment of the present disclosure may be corresponding to the network device in the method embodiment of the present disclosure, and the foregoing and other operations and/or functions of modules in the apparatus 500 are respectively used for implementing the corresponding procedures of the method 200 in FIG. 3 to FIG. 6. For brevity, details are not described herein.

Therefore, according to the downlink control information transmission apparatus in this embodiment of the present disclosure, the apparatus sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, according to the downlink control information transmission apparatus in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

Figure 11:
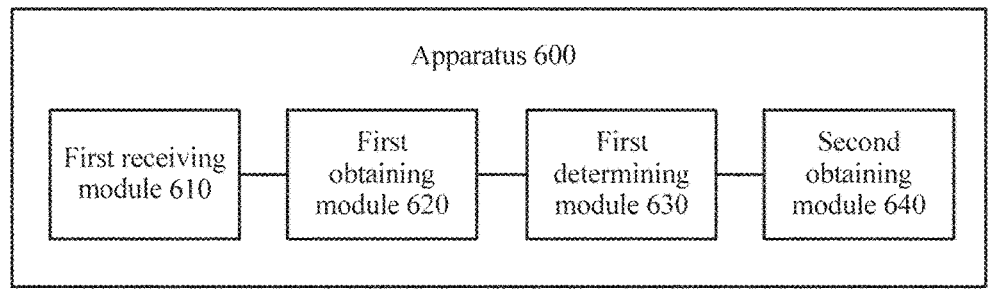
FIG. 11 is a schematic block diagram of a downlink control information transmission apparatus according to another embodiment of the present disclosure.
Figure 12:
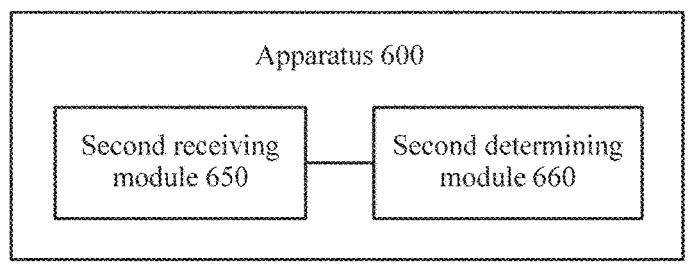
FIG. 12 is another schematic block diagram of a downlink control information transmission apparatus according to another embodiment of the present disclosure.

With reference to FIG. 9 and FIG. 10, the foregoing describes in detail the downlink control information transmission apparatus according to the embodiment of the present disclosure from a perspective of a network device. With reference to FIG. 11 and FIG. 12, the following describes in detail a downlink control information transmission apparatus according to an embodiment of the present disclosure from a perspective of a terminal device.

FIG. 11 shows a downlink control information transmission apparatus 600 according to an embodiment of the present disclosure. As shown in FIG. 11, the apparatus 600 includes:

a first receiving module 610, configured to receive downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device;

a first obtaining module 620, configured to obtain the common control information according to the downlink control information received by the first receiving module 610;

a first determining module 630, configured to determine order information of device identifier information of a first terminal device according to the device identifier information of each terminal device in the downlink control information received by the first receiving module 610; and a second obtaining module 640, configured to obtain dedicated control information of the first terminal device from the downlink control information according to the order information determined by the first determining module 630.

Therefore, according to the downlink control information transmission apparatus in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

In this embodiment of the present disclosure, optionally, as shown in FIG. 12, the apparatus 600 further includes:

a second receiving module 650, configured to: after the first receiving module 610 receives the downlink control information sent by the network device, receive downlink data flows of the multiple terminal devices that are sent by the network device; and a second determining module 660, configured to determine, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

In this embodiment of the present disclosure, optionally, each terminal device has a same quantity of downlink data flows.

In this embodiment of the present disclosure, optionally, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

In this embodiment of the present disclosure, optionally, the dedicated control information of each terminal device includes hybrid automatic repeat request HARQ information and/or modulation and coding scheme MCS information of each terminal device.

In this embodiment of the present disclosure, optionally, the apparatus 600 is user equipment.

It should be understood that, the downlink control information transmission apparatus 600 according to this embodiment of the present disclosure may be corresponding to the terminal device in the method embodiment of the present disclosure, and the foregoing and other operations and/or functions of modules in the apparatus 600 are respectively used for implementing the corresponding procedures of the method 300 in FIG. 7 and FIG. 8. For brevity, details are not described herein.

Therefore, according to the downlink control information transmission apparatus in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, according to the downlink control information transmission apparatus in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

Figure 13:
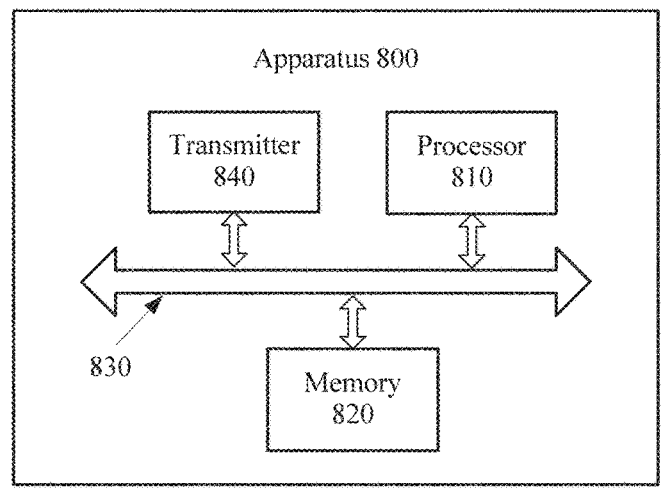
FIG. 13 is a schematic block diagram of a downlink control information transmission apparatus according to still another embodiment of the present disclosure.

As shown in FIG. 13, an embodiment of the present disclosure further provides a downlink control information transmission apparatus 800, and the apparatus 800 includes a processor 810, a memory 820, a bus system 830, and a transmitter 840, where the processor 810, the memory 820, and the transmitter 840 are connected by using the bus system 830, the memory 820 is configured to store an instruction, and the processor 810 is configured to execute the instruction stored in the memory 820, so as to control the transmitter 840 to send a signal.

The processor 810 is configured to: determine multiple terminal devices used for downlink scheduling; and determine downlink control information used by the multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device.

The transmitter 840 is configured to send the downlink control information to the multiple terminal devices.

Therefore, according to the downlink control information transmission apparatus in this embodiment of the present disclosure, the apparatus sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

It should be understood that, in this embodiment of the present disclosure, the processor 810 may be a central processing unit (CPU), or the processor 810 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 820 may include a read-only memory and a random access memory, and provide an instruction and data for the processor 810. A part of the memory 820 may further include a nonvolatile random access memory. For example, the memory 820 may further store information about a device type.

In addition to a data bus, the bus system 830 may include a power bus, a control bus, a status signal bus, and the like. However, for clarity of description, various buses are marked as the bus system 830 in the figure.

In an implementation process, the steps in the foregoing method may be completed by using an integrated logic circuit of hardware in the processor 810 or an instruction in a form of software. The steps of the method disclosed with reference to the embodiments of the present disclosure may be directly executed and completed by a hardware processor, or may be executed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 820. The processor 810 reads information from the memory 820, and completes the steps of the foregoing method in combination with hardware in the processor 810. To avoid repetition, details are not described herein.

Optionally, in an embodiment, the transmitter 840 is further configured to:

send the downlink data flows of the multiple terminal devices to the multiple terminal devices according to the downlink control information, where the order of the device identifier information of each terminal device is the same as an order of a downlink data flow of each terminal device.

Optionally, in an embodiment, each terminal device has a same quantity of downlink data flows that are sent by the transmitter 840.

Optionally, in an embodiment, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

Optionally, in an embodiment, the dedicated control information of each terminal device includes hybrid automatic repeat request (HARQ) information and/or modulation and coding scheme (MCS) information of each terminal device.

Optionally, in an embodiment, the apparatus 800 is a network device.

It should be understood that the downlink control information transmission apparatus 800 according to this embodiment of the present disclosure may be corresponding to the network device and the apparatus 500 in the embodiments of the present disclosure, or may be corresponding to a corresponding entity that executes the method according to the embodiment of the present disclosure, and the foregoing and other operations and/or functions of the modules of the apparatus 800 are respectively used for implementing the corresponding procedures of the method in FIG. 3 to FIG. 6. For brevity, details are not described herein.

Therefore, according to the downlink control information transmission apparatus in this embodiment of the present disclosure, the network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, according to the downlink control information transmission apparatus in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

Figure 14:
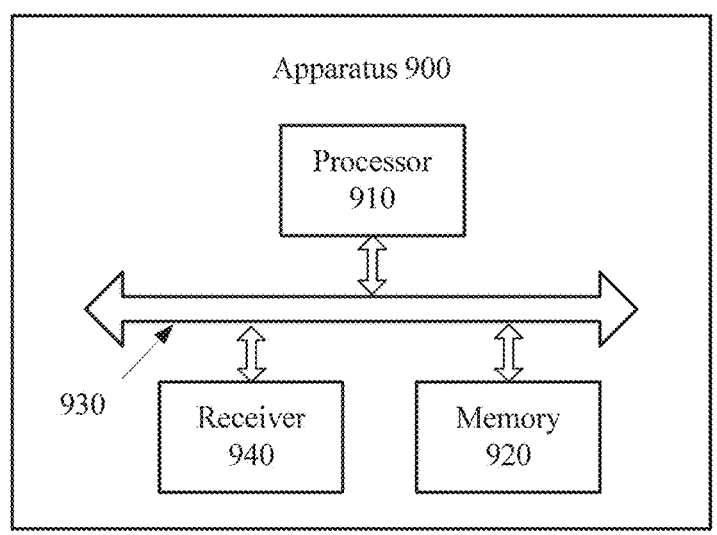
FIG. 14 is a schematic block diagram of a downlink control information transmission apparatus according to yet another embodiment of the present disclosure.

As shown in FIG. 14, an embodiment of the present disclosure further provides a downlink control information transmission apparatus 900, and the apparatus 900 includes a processor 910, a memory 920, a bus system 930, and a receiver 940, where the processor 910, the memory 920, and the receiver 940 are connected by using the bus system 930, the memory 920 is configured to store an instruction, and the processor 910 is configured to execute the instruction stored in the memory 920, so as to control the receiver 940 to receive a signal.

The receiver 940 is configured to receive downlink control information that is sent by a network device and that is used by multiple terminal devices to receive downlink data flows, where the downlink control information includes common control information shared by the multiple terminal devices, dedicated control information of each of the multiple terminal devices, and device identifier information of each terminal device, and an order of the device identifier information of each terminal device is the same as an order of the dedicated control information of each terminal device.

The processor 910 is configured to:

obtain the common control information according to the downlink control information;

determine order information of device identifier information of a first terminal device according to the device identifier information of each terminal device in the downlink control information; and obtain dedicated control information of the first terminal device from the downlink control information according to the order information.

Therefore, according to the downlink control information transmission apparatus in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads.

It should be understood that, in this embodiment of the present disclosure, the processor 910 may be a central processing unit (CPU), or the processor 910 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 920 may include a read-only memory and a random access memory, and provide an instruction and data for the processor 910. A part of the memory 920 may further include a nonvolatile random access memory. For example, the memory 920 may further store information about a device type.

In addition to a data bus, the bus system 930 may include a power bus, a control bus, a status signal bus, and the like. However, for clarity of description, various buses are marked as the bus system 930 in the figure.

In an implementation process, the steps in the foregoing method may be completed by using an integrated logic circuit of hardware in the processor 910 or an instruction in a form of software. The steps of the method disclosed with reference to the embodiments of the present disclosure may be directly executed and completed by a hardware processor, or may be executed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 920. The processor 910 reads information from the memory 920, and completes the steps of the foregoing method in combination with hardware in the processor 810. To avoid repetition, details are not described herein.

Optionally, in an embodiment, the receiver 940 is further configured to: after receiving the downlink control information sent by the network device, receive downlink data flows of the multiple terminal devices that are sent by the network device.

The processor 910 is further configured to determine, according to the common control information, the dedicated control information of the first terminal device, and the order information, a downlink data flow of the first terminal device from the downlink data flows of the multiple terminal devices that are sent by the network device, where the order of the device identifier information of each terminal device is the same as an order of a downlink data flow of each terminal device.

Optionally, in an embodiment, each terminal device has a same quantity of downlink data flows.

Optionally, in an embodiment, the common control information includes at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

Optionally, in an embodiment, the dedicated control information of each terminal device includes hybrid automatic repeat request HARQ information and/or modulation and coding scheme MCS information of each terminal device.

Optionally, in an embodiment, the apparatus 900 is user equipment.

It should be understood that the downlink control information transmission apparatus 900 according to this embodiment of the present disclosure may be corresponding to the terminal device and the apparatus 600 in the embodiments of the present disclosure, or may be corresponding to a corresponding entity that executes the method according to the embodiment of the present disclosure, and the foregoing and other operations and/or functions of the modules of the apparatus 900 are respectively used for implementing the corresponding procedures of the method in FIG. 7 and FIG. 8. For brevity, details are not described herein.

Therefore, according to the downlink control information transmission apparatus in this embodiment of the present disclosure, a network device sends common control information shared by multiple terminal devices used for downlink scheduling to the multiple terminal devices, so as to avoid repeatedly sending the common control information to each terminal device, thereby remarkably reducing system overheads. In another aspect, according to the downlink control information transmission apparatus in this embodiment of the present disclosure, an order of device identifier information of each terminal device in downlink control information is set to be the same as an order of dedicated control information of each terminal device, so as to avoid a case in which the network device separately indicates the corresponding dedicated control information to each terminal device, thereby further reducing the system overheads. In still another aspect, according to the downlink control information transmission apparatus in this embodiment of the present disclosure, the order of the device identifier information of each terminal device in the downlink control information is set to be the same as an order of a downlink data flow of each terminal device, so as to avoid a case in which the network device separately indicates corresponding downlink data flow information to each terminal device, thereby further reducing the system overheads.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should be further understood that determining A according to B does not mean that B is determined according to A only; that is, B may be determined according to A and/or other information.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for ease and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions in the embodiments of the present disclosure.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the present disclosure essentially, or the part contributing to the prior art, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing technical features and descriptions in an embodiment may be considered to be applicable to another embodiment. To describe this application document briefly and clearly, details are not described in the other embodiment.

The foregoing descriptions are merely specific embodiments of the present disclosure, but are not intended to limit the protection scope of the present disclosure. Any modification or replacement readily figured out by persons skilled in the art within the technical scope disclosed in the present disclosure shall fall within the protection scope of the present disclosure. Therefore, the protection scope of the present disclosure shall be subject to the protection scope of the claims.

Further, the present application also discloses following embodiments:

Embodiment 1

A downlink control information transmission apparatus, comprising a processor, a memory, a bus system, and a transmitter, wherein the processor, the memory, and the transmitter are connected by using the bus system, the memory is configured to store an instruction, and the processor is configured to execute the instruction stored in the memory, so as to control the transmitter to send a signal; wherein the processor is configured to: determine multiple terminal devices used for downlink scheduling; and determine downlink control information used by the multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device; and the transmitter is configured to send the downlink control information to the multiple terminal devices.

Embodiment 2

The apparatus according to embodiment 1, wherein the transmitter is further configured to:

send the downlink data flows of the multiple terminal devices to the multiple terminal devices according to the downlink control information, wherein the order of the device identifier information of each terminal device is the same as an order of a downlink data flow of each terminal device.

Embodiment 3

The apparatus according to embodiment 2, wherein each terminal device has a same quantity of downlink data flows that are sent by the transmitter.

Embodiment 4

The apparatus according to any one of embodiments 1 to 3, wherein the common control information comprises at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

Embodiment 5

The apparatus according to any one of embodiments 1 to 4, wherein the dedicated control information of each terminal device comprises HARQ information and/or MCS information of each terminal device.

Embodiment 6

The apparatus according to any one of embodiments 1 to 5, wherein the apparatus is a network device.

Embodiment 7

A downlink control information transmission apparatus, comprising a processor, a memory, a bus system, and a receiver, wherein the processor, the memory, and the receiver are connected by using the bus system, the memory is configured to store an instruction, and the processor is configured to execute the instruction stored in the memory, so as to control the receiver to receive a signal; wherein the receiver is configured to receive downlink control information that is sent by a network device and that is used by multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device; and the processor is configured to:

obtain the common control information according to the downlink control information;

determine order information of device identifier information of a first terminal device according to the device identifier information of each terminal device in the downlink control information; and obtain dedicated control information of the first terminal device from the downlink control information according to the order information.

Embodiment 8

The apparatus according to embodiment 7, wherein the receiver is further configured to: after receiving the downlink control information sent by the network device, receive downlink data flows of the multiple terminal devices that are sent by the network device; and the processor is further configured to determine, according to the common control information, the dedicated control information of the first terminal device, and the order information, a downlink data flow of the first terminal device from the downlink data flows of the multiple terminal devices that are sent by the network device, wherein the order of the device identifier information of each terminal device is the same as an order of a downlink data flow of each terminal device.

Embodiment 9

The apparatus according to embodiment 8, wherein each terminal device has a same quantity of downlink data flows.

Embodiment 10

The apparatus according to any one of embodiments 7 to 9, wherein the common control information comprises at least one of the following information: resource allocation information of time-frequency resources for carrying the downlink data flows of the multiple terminal devices, or precoding matrix information or non-orthogonal multiple access codebook information for sending the downlink data flows of the multiple terminal devices.

Embodiment 11

The apparatus according to any one of embodiments 7 to 10, wherein the dedicated control information of each terminal device comprises HARQ information and/or MCS information of each terminal device.

Embodiment 12

The apparatus according to any one of embodiments 7 to 11, wherein the apparatus is user equipment.

What is claimed is:

1. A downlink control information transmission method, comprising:

determining multiple terminal devices used for downlink scheduling;

determining downlink control information used by the multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device; and sending the downlink control information to the multiple terminal devices.

2. The method according to claim 1, further comprising:

sending the downlink data flows of the multiple terminal devices to the multiple terminal devices according to the downlink control information, wherein the order of the device identifier information of each terminal device is the same as an order of a downlink data flow of each terminal device.

3. The method according to claim 2, wherein each terminal device has a same quantity of downlink data flows.

4. The method according to claim 1, wherein the common control information comprises at least one of the following:

resource allocation information of time-frequency resources for carrying the downlink data flows of the multiple terminal devices; or precoding matrix information or non-orthogonal multiple access codebook information for sending the downlink data flows of the multiple terminal devices.

5. The method according to claim 1, wherein the dedicated control information of each terminal device comprises hybrid automatic repeat request (HARQ) information and/or modulation and coding scheme (MCS) information of each terminal device.

6. A downlink control information transmission method, comprising:

receiving downlink control information sent by a network device and used by multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device;

obtaining the common control information according to the downlink control information;

determining order information of device identifier information of a first terminal device according to the device identifier information of each terminal device in the downlink control information; and obtaining dedicated control information of the first terminal device from the downlink control information according to the order information.

7. The method according to claim 6, wherein after receiving the downlink control information sent by the network device, the method further comprises:

receiving downlink data flows of the multiple terminal devices that are sent by the network device; and determining, according to the common control information, the dedicated control information of the first terminal device, and the order information, a downlink data flow of the first terminal device from the downlink data flows of the multiple terminal devices that are sent by the network device, wherein the order of the device identifier information of each terminal device is the same as an order of a downlink data flow of each terminal device.

8. The method according to claim 7, wherein each terminal device has a same quantity of downlink data flows.

9. The method according to claim 6, wherein the common control information comprises at least one of the following:

resource allocation information of time-frequency resources for carrying the downlink data flows of the multiple terminal devices; or precoding matrix information or non-orthogonal multiple access codebook information for sending the downlink data flows of the multiple terminal devices.

10. The method according to claim 6, wherein the dedicated control information of each terminal device comprises hybrid automatic repeat request (HARQ) information and/or modulation and coding scheme (MCS) information of each terminal device.

11. A downlink control information transmission apparatus, comprising:

a processor configured to:

determine multiple terminal devices used for downlink scheduling, and determine downlink control information used by the determined multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device; and a transmitter configured to send the downlink control information determined by the processor to the multiple terminal devices.

12. The apparatus according to claim 11, wherein the transmitter is configured to:

send the downlink data flows of the multiple terminal devices to the multiple terminal devices according to the downlink control information, wherein the order of the device identifier information of each terminal device is the same as an order of a downlink data flow of each terminal device.

13. The apparatus according to claim 12, wherein each terminal device has a same quantity of downlink data flows sent by the transmitter.

14. The apparatus according to claim 11, wherein the common control information comprises at least one of the following:

resource allocation information of time-frequency resources for carrying the downlink data flows of the multiple terminal devices; or precoding matrix information or non-orthogonal multiple access codebook information for sending the downlink data flows of the multiple terminal devices.

15. The apparatus according to claim 11, wherein the dedicated control information of each terminal device comprises hybrid automatic repeat request (HARQ) information and/or modulation and coding scheme (MCS) information of each terminal device.

16. A downlink control information transmission apparatus, comprising:

a receiver configured to receive downlink control information sent by a network device and used by multiple terminal devices to receive downlink data flows, wherein the downlink control information comprises common control information shared by the multiple terminal devices, dedicated control information of each of the multiple terminal devices, and device identifier information of each terminal device, and an order of the device identifier information of each terminal device is the same as an order of the dedicated control information of each terminal device; and a processor configured to:

obtain the common control information according to the downlink control information received by the receiver, determine order information of device identifier information of a first terminal device according to the device identifier information of each terminal device in the downlink control information received by the receiver, and obtain dedicated control information of the first terminal device from the downlink control information according to the determined order information.

17. The apparatus according to claim 16, wherein:

the receiver is configured to: after receiving the downlink control information sent by the network device, receive downlink data flows of the multiple terminal devices sent by the network device; and the processor is configured to: determine, according to the common control information, the dedicated control information of the first terminal device, and the order information, a downlink data flow of the first terminal device from the downlink data flows of the multiple terminal devices sent by the network device, wherein the order of the device identifier information of each terminal device is the same as an order of a downlink data flow of each terminal device.

18. The apparatus according to claim 17, wherein each terminal device has a same quantity of downlink data flows.

19. The apparatus according to claim 16, wherein the common control information comprises at least one of the following:

resource allocation information of time-frequency resources for carrying the downlink data flows of the multiple terminal devices; or precoding matrix information or non-orthogonal multiple access codebook information for sending the downlink data flows of the multiple terminal devices.

20. The apparatus according to claim 16, wherein the dedicated control information of each terminal device comprises hybrid automatic repeat request (HARQ) information and/or modulation and coding scheme (MCS) information of each terminal device.

\* \* \* \* \*